United States Patent
Bono et al.

(10) Patent No.: US 10,146,703 B1
(45) Date of Patent: Dec. 4, 2018

(54) ENCRYPTING DATA OBJECTS IN A DATA STORAGE SYSTEM

(71) Applicant: EMC Corporation, Hopkinton, MA (US)

(72) Inventors: Jean-Pierre Bono, Westborough, MA (US); Frederic Corniquet, Les Pecq (FR); William Davenport, San Diego, CA (US); Philippe Armangau, Acton, MA (US); Walter Forrester, Berkely Heights, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 14/984,185

(22) Filed: Dec. 30, 2015

(51) Int. Cl.
*G06F 12/14* (2006.01)
*G06F 3/06* (2006.01)
*H04L 9/06* (2006.01)

(52) U.S. Cl.
CPC .......... *G06F 12/1408* (2013.01); *G06F 3/064* (2013.01); *G06F 3/0623* (2013.01); *G06F 3/0643* (2013.01); *G06F 3/0683* (2013.01); *H04L 9/06* (2013.01); *G06F 2212/1052* (2013.01); *G06F 2212/22* (2013.01)

(58) Field of Classification Search
CPC .. G06F 12/1408; G06F 3/0683; G06F 3/0643; H04L 9/06
USPC .................................................. 380/277–279
See application file for complete search history.

(56) References Cited

U.S. PATENT DOCUMENTS

| | | | |
|---|---|---|---|
| 6,735,693 B1 | 5/2004 | Hamlin | |
| 6,952,698 B2 * | 10/2005 | Delaire | G06F 17/30197 |
| 8,117,464 B1 * | 2/2012 | Kogelnik | H04L 63/0428 380/284 |
| 8,239,691 B2 | 8/2012 | Watanabe et al. | |
| 8,352,941 B1 | 1/2013 | Protopopov et al. | |
| 8,370,401 B2 * | 2/2013 | Gordon | G06F 17/30607 707/808 |
| 8,429,499 B2 | 4/2013 | Akiyama et al. | |
| 8,612,776 B2 * | 12/2013 | Hakamata | G06F 3/0605 713/193 |
| 2010/0310075 A1 * | 12/2010 | Lin | G06F 21/10 380/278 |

(Continued)

OTHER PUBLICATIONS

Kerr et al., "Bitstream Binding Language—Mapping XML Multimedia Containers into Streams," 2005 IEEE International Conference on Multimedia and Expo Year: 2005 pp. 626-629.*

(Continued)

*Primary Examiner* — Roderick Tolentino
(74) *Attorney, Agent, or Firm* — BainwoodHuang (57) ABSTRACT

Techniques for providing encryption of individual data objects in a data storage system include realizing data objects in the form of container files stored in a set of file systems, and encrypting individual ones of the data objects by encrypting the container files realizing the data objects using encryption keys associated with the individual data objects. By independently encrypting the container files that realize individual data objects, the disclosed system provides per-data object encryption. Each data object may be encrypted differently, e.g. using a different encryption key, even when multiple data objects are hosted over the same storage device or over a shared set of storage devices.

25 Claims, 3 Drawing Sheets

(56) References Cited

U.S. PATENT DOCUMENTS

| | | | | |
|---|---|---|---|---|
| 2012/0151222 A1* | 6/2012 | Koifman | ............. | G06F 12/1408 |
| | | | | 713/189 |
| 2012/0239943 A1* | 9/2012 | Okamoto | ............ | G06F 21/6218 |
| | | | | 713/193 |
| 2015/0082081 A1* | 3/2015 | Akirav | ................ | G06F 11/1469 |
| | | | | 714/6.22 |
| 2016/0034721 A1* | 2/2016 | Moriguchi | .......... | G06F 21/6218 |
| | | | | 713/193 |
| 2017/0090898 A1* | 3/2017 | Branson | .................... | G06F 8/65 |
| 2017/0091236 A1* | 3/2017 | Hayes | ............... | G06F 17/30318 |

OTHER PUBLICATIONS

Garcia et al., "Data management and analysis at the Large Scale Data Facility," 2011 Sixth International Conference on Digital Information Management Year: 2011 pp. 235-241.*

* cited by examiner

ENCRYPTING DATA OBJECTS IN A DATA STORAGE SYSTEM

BACKGROUND

Data storage systems are arrangements of hardware and software that typically include multiple storage processors coupled to arrays of non-volatile storage devices, such as magnetic disk drives, electronic flash drives, and/or optical drives, for example. The storage processors service storage requests that arrive from host machines and that specify files or other data elements to be written, read, created, or deleted, for example. The storage processors run software that manages incoming storage requests and performs various data processing tasks to organize and secure data stored on the non-volatile storage devices.

In order to protect the data they store, data storage systems have sometimes used data encryption. In some previous systems, data encryption has been provided by one or more disk controllers associated with specific disk drives of the storage system.

SUMMARY

Although controller based encryption provides basic protection against unauthorized access to encrypted data stored in a data storage system, it has significant shortcomings. For example, controller based encryption cannot provide different types of encryption for data objects hosted over a single disk, since controller based encryption encrypts all data on the disk in the same way. Accordingly, encryption provided by controller based encryption does not prevent data leakage between data objects hosted over the same disk. Such data leakage may be problematic when the data objects are used by different entities and/or users. Also, controller based encryption is not applicable in situations where there is no disk controller, e.g. when data objects are provided over a flash drive, or when a virtual machine is used to host data objects from one or more virtual disks.

Improved techniques are disclosed for providing encryption of data objects at object-level granularity. As disclosed herein, the storage system realizes data objects in the form of container files stored in a set of file systems, and encrypts the data objects by encrypting the respective container files. By encrypting the container files that realize the data objects, the disclosed system provides per-data-object encryption, with each data object encrypted using an encryption key. Accordingly, multiple data objects may each be encrypted differently, e.g. using a different encryption key, even when multiple data objects are hosted over the same storage device or over a shared set of storage devices.

Certain embodiments are directed to a method of providing encryption for data objects in a data storage system. The method includes realizing the data objects by the storage system in the form of container files stored in a set of file systems. The data objects are accessible by at least one host, and the file systems are internal to the storage system. The file systems map the contents of the container files to a set of storage devices providing storage for the file systems. The method further includes encrypting each one of the data objects by encrypting the respective container file realizing the data object using an encryption key associated with the data object.

Other embodiments are directed to a data storage system constructed and arranged to perform a method of providing encryption for data objects in a data storage system, such as the method described above. Still other embodiments are directed to a computer program product. The computer program product stores instructions which, when executed on one or more processing units of a data storage system, cause the processing units to perform a method of managing storage for a data object, such as the method described above. Some embodiments involve activity that is performed at a single location, while other embodiments involve activity that is distributed over multiple locations, e.g., over a network.

Embodiments of the disclosed techniques may provide significant improvements over previous solutions. For example, because embodiments of the disclosed techniques may differently encrypt container files that realize different data objects (e.g. using different encryption keys), encrypted data from one data object cannot be accessed through a different data object. As a result, leakage may be prevented between different data objects hosted over the same disk, or over a shared set of disks. In another example, storage deallocated from one of the file systems may be securely "erased" simply by disposing of the encryption key associated with the data object realized by the container file stored in the file system. And as a potential further advantage, embodiments of the disclosed techniques may be used even when there is no disk controller, e.g. when data objects are provided over a flash drive, or when a virtual machine is used to host data objects using one or more virtual disks.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It should be understood that such embodiments are provided by way of example to illustrate various features and principles of the invention, and that the invention hereof is broader than the specific example embodiments disclosed.

Improved techniques for providing encryption of data objects at object-level granularity in a data storage system include realizing data objects in the form of container files stored in a set of file systems, and encrypting the data objects by encrypting the respective container files.

Figure 1:
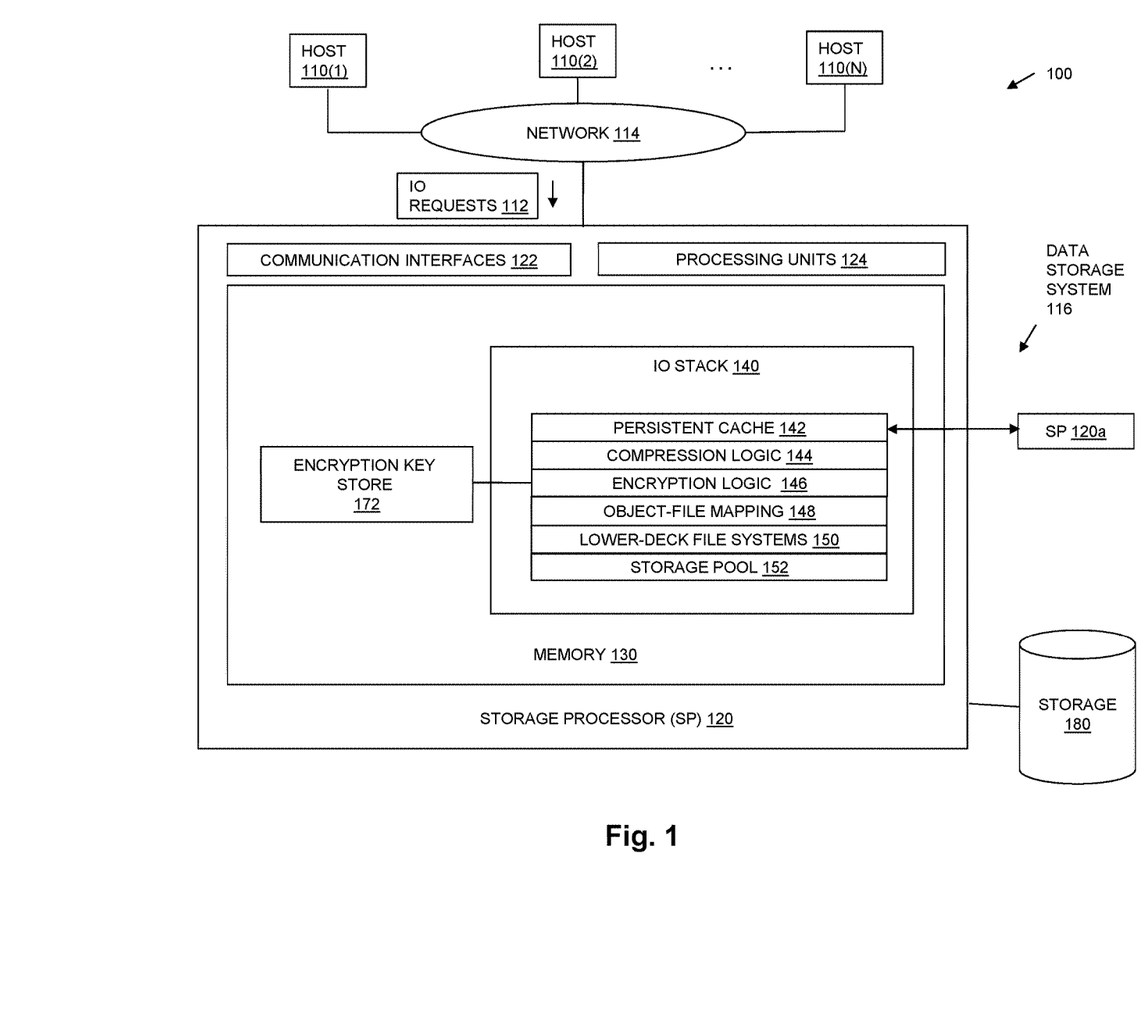
FIG. 1 is a block diagram showing an example environment in which techniques hereof may be practiced, the environment including an illustrative embodiment of the disclosed techniques for encrypting data objects in a data storage system.

FIG. 1 shows an example environment 100 in which embodiments of the disclosed techniques hereof can be practiced, including an illustrative embodiment of the disclosed techniques for encrypting data objects in a data storage system. As shown in FIG. 1, multiple host computing devices ("hosts"), shown as devices 110(1) through 110(N), and/or host applications executing in whole or in part on devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120*a*). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

In an example, the storage 180 takes the form of RAID groups, where each RAID group is composed of multiple disk drives. The disk drives may include magnetic disk drives, electronic flash drives, optical drives, and/or other types of drives. In a typical example, each RAID group includes disk drives of a common type that provide similar performance. It should be understood, though, that there is no requirement for the storage 180 to be organized in RAID groups.

The network 114 can be any type of network or combination of networks, such as a storage area network (SAN), a local area network (LAN), a wide area network (WAN), the Internet, and/or some other type of network or combination of networks, for example. The hosts 110(1-N), and/or host applications executing in whole or in part on hosts 110(1-N), may connect to the SP 120 using various technologies, such as Fibre Channel, iSCSI, NFS, SMB 3.0, and CIFS, for example. Any number of hosts 110(1-N) and/or host application executing in whole or in part on hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive 10 requests 112 according to both block-based and file-based protocols and to respond to such IO requests 112 by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes (i.e., realizes by operation of programming code) an IO stack 140. The IO stack 140 provides an execution path for host IOs (e.g., IO requests 112).

The IO stack 140 is seen to include, for example, a persistent cache 142, compression logic 144, encryption logic 146, object-file mapping 148, lower-deck file systems 150, and storage pool 152. The lower-deck file systems 150 store container files that are used to realize multiple data objects. For example, multiple data objects may be realized in respective container files stored in lower-deck file systems 150. Each one of the data objects having a respective container file stored in one of the lower-deck file systems 150 may take the form of a LUN (Logical Unit Number), a host file system, a VVol (virtual volume, for example a virtual machine disk, e.g., as available from VMware, Inc. of Palo Alto, Calif.), or some other type of data object, for example. Object-file mapping 148 converts IO requests directed to each one of the data objects into corresponding reads and writes of the respective one of the container files stored in lower deck file systems 150. For example, each one of the container files stored in lower deck file systems 150 may have a logical address space and a set of associated physical addresses. The logical address space for the container file may, for example, be a monotonic range of logical offsets into the container file, e.g., as tracked by an "inode" structure of the container file. The inode structure for the container file may also be stored in the one of the lower-deck file systems 150 that stores the container file. The set of physical addresses associated with the container file are particular addresses of blocks used by the lower-deck file system that stores the container file to store the data of the container file. For purposes of explanation herein, a "block" is the smallest allocatable unit of storage, such as 8 KB, for example.

For example, the persistent cache 142 may be implemented in DRAM (Dynamic Random Access Memory). The DRAM may be mirrored to DRAM on at least one other SP (e.g., on SP 120*a*), and the DRAM on both SPs may be backed up by battery. The contents of the cache 142 may thus persist on at least two SPs, even in the event of a power loss. The persistent cache 142 may thus provide the speed characteristics of DRAM while also providing persistence not normally found with DRAM.

In an example of operation, the hosts 110(1-N), and/or host applications executing on hosts 110(1-N), issue IO requests 112 to the data storage system 116. The SP 120 receives the IO requests 112 at the communication interfaces 122 and passes the IO requests to the IO stack 140 for further processing. The IO requests 112 include write requests. Each write request may specify a data object, and specify (e.g. include) data to be written to the data object. For each one of the write requests received by Storage Processor 120, the specified data is stored in persistent cache 142. The storage processor 120 may also provide an acknowledgment to the host that issued the write request once the data specified by the write request has been securely stored in the persistent cache 142 (e.g., saved to battery-backed DRAM on the SP 120 and successfully mirrored to battery-backed DRAM on SP 120*a*). Such an acknowledgement indicates successful completion of the write request. The above process may be repeated for additional write requests specifying additional data to be written to various locations of the same data object. The persistent cache 142 accumulates the data specified in these requests, e.g., in the order received, and provides an acknowledgement in response to each one. In this way, data specified by one or more write requests directed to the same data object may be accumulated in persistent cache 142. It should be understood that some data storage systems may be configured to run host applications locally, i.e., in the memory 130 of the SP 120. In these arrangements, the IO requests 112 may arise internally, i.e., from the locally running applications, rather than being received from an external host.

Each write request specifies not only the data to be written but also the location at which the specified data is to be written relative to the specified data object. For example, if the specified data object is a LUN, the write request may specify the location of the data within the LUN as an offset into the LUN. If the data object is a host file system, the write request may specify the location of the data by file name and an offset into the named file. Object-file mapping 148 maps the specified data object to a respective container file used to realize the data object, and also maps the various data location indicators to a set of logical offsets within that container file. The lower-deck file system (e.g. one of lower-deck file systems 150) that stores the container file further maps these logical offsets to physical addresses of blocks of storage. In some cases, the data to be written is directed to blocks that have already been allocated and mapped by the file system that stores the container file, such that the data writes prescribe overwrites of existing blocks. In other cases, the data to be written is directed to locations that do not yet have any associated physical storage, such that the file system must allocate new blocks to the container file to store the data.

At some point in the course of accumulating data specified by one or more write requests in persistent cache 142, the compression logic 144 performs compression on the accumulated data contained in persistent cache 142, or on portions thereof.

Various specific types of lossless compression may be used by compression logic 144 to compress the accumulated data contained in persistent cache 142. For example, lossless compression performed by compression logic 144 that identifies and eliminates statistical redundancy or redundancies in the data, in such a way that the resulting compressed data may be decompressed without any loss of information.

Encryption logic 146 performs encryption of the data accumulated in persistent cache 142. The encryption performed by encryption logic 146 is data object specific. In other words, the specific encryption performed by encryption logic 146 may be different for each data object. For example, the encryption performed by encryption logic on data specified by a set of one or more write requests directed to a specific, individual data object, may be performed using an encryption key that is associated with that specific data object.

The encryption key associated with a specific data object may be obtained by encryption logic 146 from encryption key store 172. For example, encryption key store 172 may be made up of or include a database, having a number of database records, where each database record corresponds to, and is associated with, a single individual data object. A record associated with a specific data object may store information that encryption logic 146 uses to encrypt the container file used to realize that data object. Such information may include an encryption key uniquely assigned to that data object, e.g., that was assigned to the data object when the data object was created, and is not assigned to any other data object.

Encryption keys stored in encryption key store 172 may, for example, consist of or include encryption keys used by encryption logic 146 to perform symmetric-key encryption, in which the same key may be used for both encryption and decryption. However, those skilled in the art will recognize that the disclosed techniques are not limited to using symmetric-key encryption, and that the disclosed techniques may alternatively be applied using asymmetric-key encryption, in which different keys are used for encryption and decryption, and in which both an encryption key and different decryption key may be stored for a data object in a corresponding record of encryption key store.

In one embodiment, encryption logic 146 prevents access to the encryption key store 172 from outside data storage system 116 by encrypting the encryption key store 172 using an encryption key uniquely assigned to the data storage system 116. For example, encryption logic 146 may encrypt the encryption key store 172 using a master encryption key, e.g. a master symmetric encryption key uniquely assigned to data storage system 116, or a key from a key pair uniquely assigned to data storage system 116, e.g. a public key of a public/private key pair uniquely assigned to data storage system 116.

In one embodiment, after compression of the accumulated data in persistent cache 142 by compression logic 144, the encryption logic 146 may operate to encrypt the resulting compressed data. While encryption may be performed by encryption logic 146 after the data accumulated in persistent cache 142 has been compressed, the disclosed system may alternatively be embodied such that encryption is performed by encryption logic 146 on uncompressed data accumulated in persistent cache 142. Accordingly, the compression logic 144 shown in FIG. 1 should be understood to be optional. Further, in some examples, the compression logic 144 and encryption logic 146 may be combined, to provide both compression and encryption in a single set of operations.

The encryption performed by encryption logic 146 on data accumulated in persistent cache 142 may be performed on a block-by-block basis (per block), using the encryption key associated with the data object to which the accumulated data was directed. The encrypted individual blocks of the data objects may then be subsequently stored in individual blocks of the respective container files.

In an embodiment in which encryption logic 146 encrypts data accumulated in the persistent cache 142 on a block-by-block basis, and in which compression logic 144 performs compression on the accumulated data in persistent cache 142, the per-block encryption performed by encryption logic 146 may accordingly be performed on individual blocks of compressed data for a data object.

In some examples, replication of one or more data objects may be performed by the storage processor 120, using encrypted data. For example, the storage processor 120 may replicate one of the data objects to a remote replication site (e.g. in another data storage system located on network 114), by transmitting encrypted data to the remote replication site, to be stored at the replication site as an encrypted failover copy of the data object. Replication using encrypted data may accompany continuous replication, e.g., for situations in which a replication splitter is placed in the IO stack 140 after the encryption logic 146. Replication using encrypted data may also accompany snapshot-shipping replication, e.g., where snaps of the data object are generated and differences between snaps are sent to the remote replication site. In these examples, the storage processor 120 may also transmit, to the replication site, the encryption key uniquely assigned to the replicated data object, for use at the replication site to decrypt the encrypted failover copy of the data object. For example, the replication site may use the encryption key uniquely assigned to the replicated data object to decrypt the encrypted failover copy of the data object in response to read requests that are directed to the data object and received at the replication site after a failover event. For example, such a failover event may cause the replicated data object to be served from the replication site, e.g. from another data storage system, in response to a failure of storage processor 120 or some other component or components of data storage system 116. It should be appreciated that continuous replication may alternatively be performed prior to operation of the encryption logic 146, i.e., on unencrypted data. Also, it is understood that replication may operate using data that is either compressed or uncompressed.

At some point in the course of accumulating data specified by one or more write requests, and out of band with the processing of particular ones of 10 requests 112, the persistent cache 142 performs a flushing operation to send the encrypted accumulated data (or encrypted compressed accumulated data), or portions thereof, to the file systems 150 for organizing and incorporating the data into the storage 180.

One or more of the file systems 150, upon receiving the flushed encrypted data, may optionally organize file mapping in such a way as to promote full-stripe writes. Alternatively, the file systems 150 may process the encrypted data flushed from the persistent cache 142 without regard to full-stripe writes.

Figure 2:
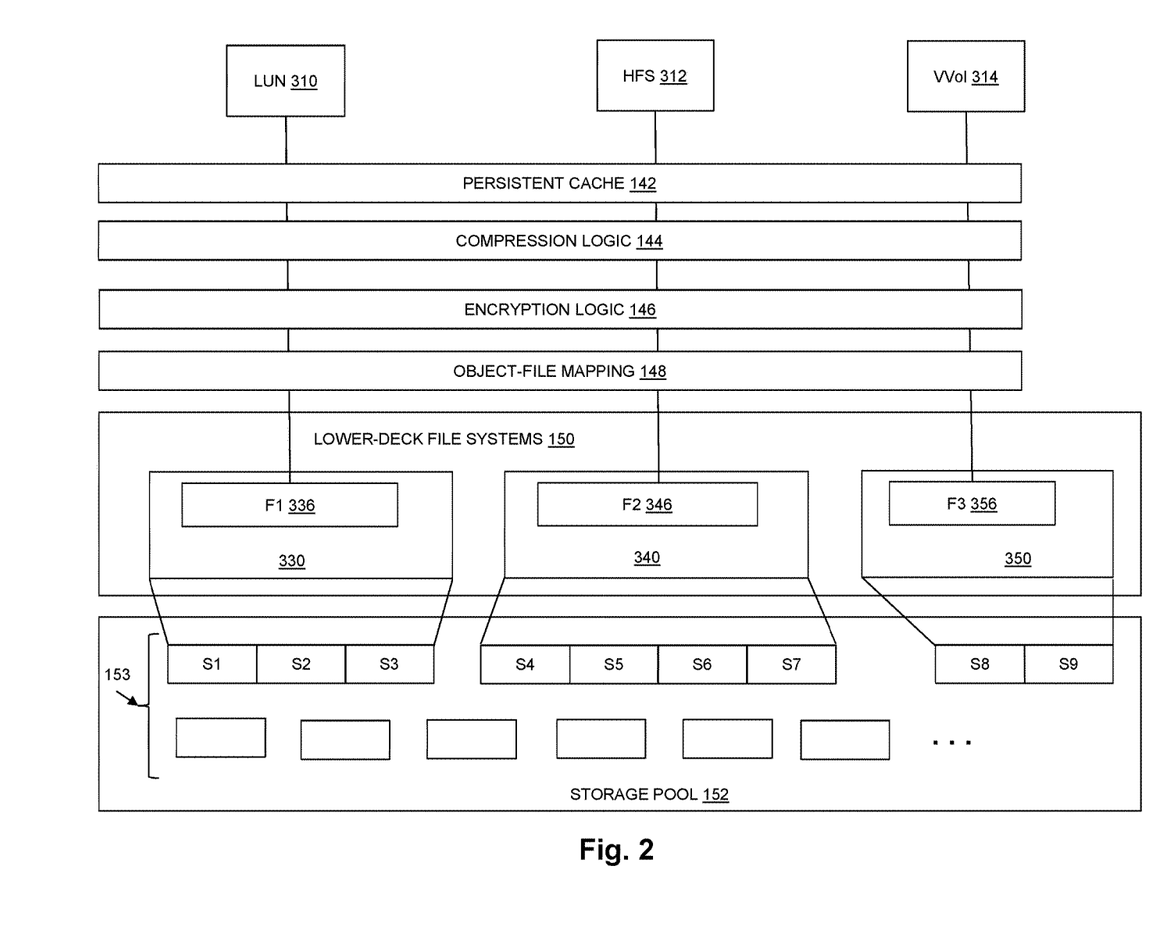
FIG. 2 is a block diagram illustrating operation of the illustrative embodiment of FIG. 1 in additional detail.

FIG. 2 is a block diagram illustrating operation of components in the illustrative embodiment of FIG. 1 in additional detail. As shown in FIG. 2, examples of data objects may include a LUN 310, an HFS (host file system) 312, and/or a VVol 314. It should be appreciated that there is no need for a data storage system to serve all three types of data objects together. Rather, some data storage systems may serve only one type of data object whereas others may serve multiple types. The example shown is merely illustrative. Here, the persistent cache 142 accumulates data specified in write requests. In some examples, the compression logic 144 compresses the accumulated data stored from persistent cache 142 on a block-denominated basis, resulting in compressed blocks of data. It should be understood that compression is not required, however. Encryption logic 146 performs data-object specific encryption on a block-denominated basis, encrypting blocks of data (compressed or otherwise) from persistent cache 142. For example, encryption logic 146 uses an encryption key uniquely assigned to LUN 310 to encrypt each block of data specified in one or more write requests directed to LUN 310, uses an encryption key uniquely assigned to HFS 312 to encrypt each block of data resulting from data specified in one or more write requests directed to HFS 312 using an encryption key uniquely assigned to HFS 312, and/or uses an encryption key uniquely assigned to VVol 314 to encrypt each block of data specified in one or more write requests directed to VVol 314 using an encryption key uniquely assigned to VVol 314. Accordingly, the encryption performed by encryption logic 146 may, for example, be performed on a per-data-object basis and at the granularity of individual blocks.

Object-file mapping 148 maps the LUN 310, HFS 312 and VVol 314 to respective container files 336 (F1), 346 (F2), and 356 (F3) in respective lower-deck file systems 330, 340, and 350. Through the various mappings, any set of blocks of the LUN 310 specified in one of 10 requests 112 is mapped to a corresponding set of blocks within the first file 336. Similarly, any file or directory of the HFS 312 specified in one of 10 requests 112 is mapped to a corresponding set of blocks within the second file 346. Likewise, any portion of the VVol 314 specified in one of IO requests 112 is mapped to a corresponding set of blocks within the third file 356.

The lower-deck file systems 330, 340, and 350 may each further include respective inode tables (not shown), providing file-specific information about the first file 336, the second file, 346, and the third file 356, respectively. The information stored in each inode includes location information (e.g., block locations) where data of the respective file are stored.

Although a single file is shown for each of the lower-deck file systems 330, 340, and 350, it is understood that each of the lower-deck file systems 330, 340, and 350 may include any number of files, with each file having its own entry in a respective inode table. In one example, each lower-deck file system stores not only the file F1, F2, or F3, but also snaps of those files, and therefore snaps of the data objects realized by the files.

As shown in FIG. 2, the file systems 330, 340 and 350 organize disk storage that is allocated to the file systems from the shared storage pool 152. Similarly, file systems 330, 340 and 350 may each operate to deallocate disk storage to the shared storage pool 152 when such disk storage is no longer needed. In the example of FIG. 2, file systems 330, 340 and 350 have allocated certain ones of the slices 153, which store the data of files F1, F2, and F3. For example, slices 51 through S3 are shown allocated to file system 330, and store the data of file F1, slices S4 through S7 are shown allocated to file system 340, and store the data of file F2, and Slices S8 through S9 are shown allocated to file system 350 and store the data of file F3.

Because the files F1, F2, and F3 each store entire data objects, including their metadata, the data stored in these files may include both metadata and ordinary data (e.g., file data). For example, file F2 stores an entire host file system (e.g. HFS 312), including its file data as well as its inodes, indirect blocks, per-block metadata, and so forth.

Advantageously, since the individual container files (e.g. F1 336, F2 346, and F3 356) that are used to realize different data objects (e.g. LUN 310, HFS 312, and VVol 314) are each encrypted with a different encryption key, the disclosed system (e.g. lower deck file systems 150) can freely move slices of storage pool 152 between individual container files realizing different data objects without concern about data leakage.

In some embodiments, the disclosed system may operate to erase data stored by a data object by destroying the encryption key associated with that data object. For example, in order to erase the data stored by LUN 310, the disclosed system may delete the encryption key associated with LUN 310. Since the data stored by LUN 310 cannot be decrypted except using the encryption key associated with LUN 310, that data is effectively erased after deletion of the encryption key associated with LUN 310. In one embodiment, the encryption key associated with LUN 310 may be deleted, and the data stored by LUN 310 effectively erased, by destroying (e.g. permanently deleting) the record or contents of the record associated with LUN 310 from encryption key store 172.

Figure 3:
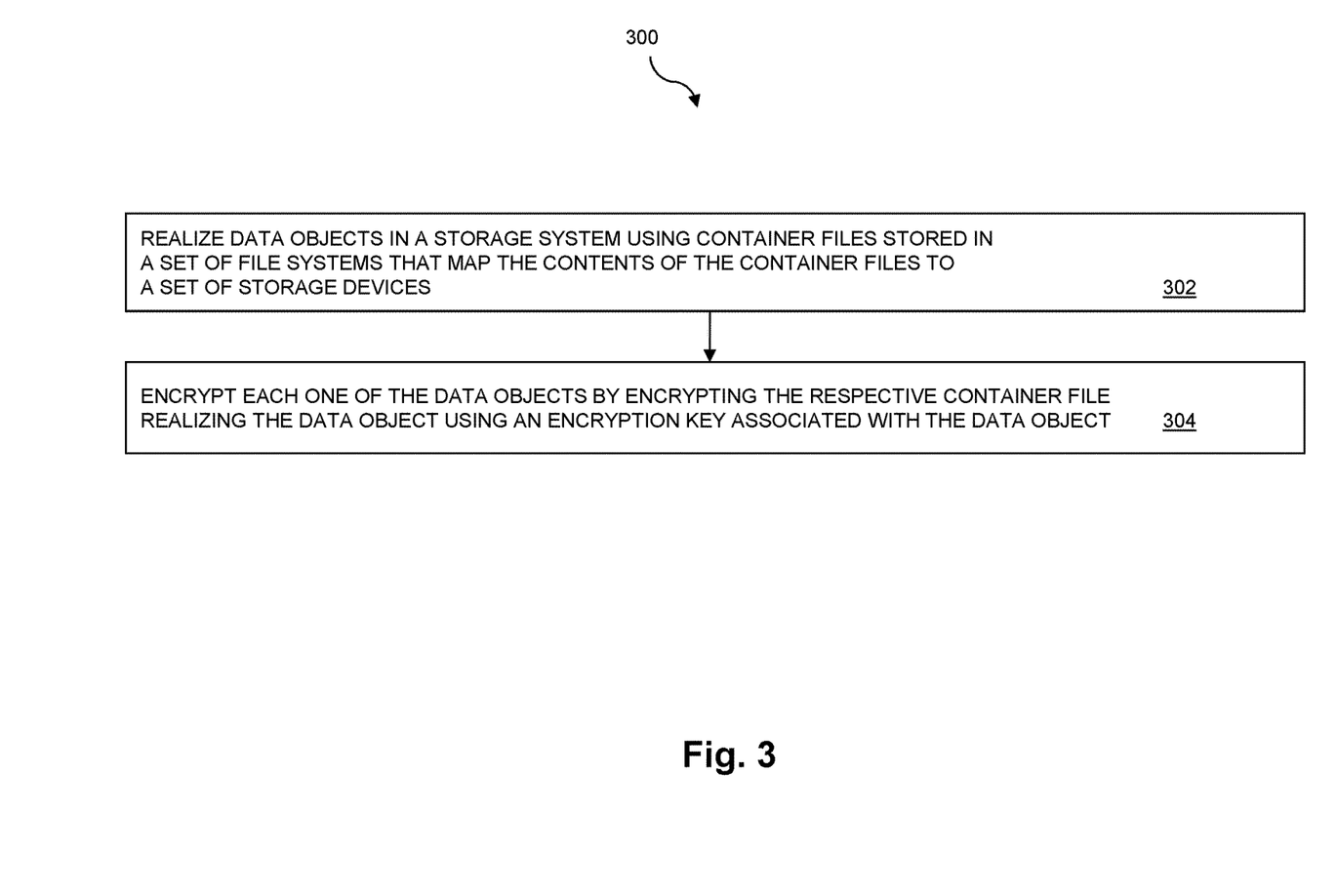
FIG. 3 is a flow chart showing an example of a process for encrypting data objects in a data storage system using the disclosed techniques.

FIG. 3 is a flow chart showing an example of a process 300 for encrypting data objects in a data storage system using the disclosed techniques. At 302 data objects are realized by the storage system in the form of container files stored in a set of file systems. The data objects are accessible by at least one host or host application, and the file systems are internal to the storage system. The contents of the container files are mapped by the file systems to a set of storage devices providing storage for the file systems. Each one of the data objects is encrypted at 306 by encrypting the respective container file realizing the data object using an encryption key associated with the data object.

Improved techniques have been described for providing encryption of data objects at object-level granularity. The disclosed techniques include a storage system realizing data objects in the form of container files stored in a set of file systems, and encrypting the data objects by encrypting the respective container files. By encrypting the container files that realize the data objects, the techniques provide per-data-object encryption, with the data for each data object being encrypted using an encryption key assigned to the data object. As a result, multiple data objects may each be encrypted differently, using different encryption keys, even when multiple data objects are hosted over the same storage device or over a shared set of storage devices.

Embodiments of the disclosed techniques may provide significant improvements over previous technical solutions. For example, because embodiments of the disclosed techniques may differently encrypt container files that realize different data objects (e.g. using different encryption keys), encrypted data from one data object cannot be accessed through a different data object. As a result, leakage may be prevented between different data objects hosted over the same disk, or over a shared set of disks. In some embodiments, storage deallocated from one of the file systems may be securely "erased" by disposing of the encryption key associated with the data object realized by the container file stored in the file system. And as a potential further advantage, embodiments of the disclosed techniques may be used even when there is no disk controller, e.g. when data objects are provided over a flash drive, or when a virtual machine is used to host data objects from one or more virtual disks.

Having described certain embodiments, numerous alternative embodiments or variations can be made. For example, while hosts and/or host applications that access the data objects by issuing TO requests to the data objects may be remotely located and external to the data storage system, the disclosed techniques are not limited to such operational environments. Those skilled in the art will accordingly recognize that the disclosed techniques may also be used in an operational environment in which host applications running wholly or partly within the data storage system 116 may access the data objects by issuing TO requests to the data objects.

Also, while the hosts and data storage system may be provided in whole or in part based on or using various specific types of physical hardware devices, the hosts and/or data storage system may alternatively be provided as one or more processes executing on one or more virtual machines, e.g. in a cloud computing environment. Similarly, whereas the disclosed techniques may be provided using physical disk drives made up of magnetic disk drives, electronic flash drives, and/or optical drives, the disclosed techniques may alternatively operate based on one or more virtual drives.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transitory computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of providing encryption for data objects in a data storage system, the method comprising:

mapping each one of a plurality of data objects, by a storage processor in the data storage system, to a single respective one of a plurality of container files stored in a set of file systems located within the storage processor, wherein the data objects are served by the data storage system and accessible over a network by at least one host application executing in one or more of a plurality of host computing devices, wherein the file systems are internal to the storage processor in the data storage system, wherein the storage processor converts input/output requests received over the network by the storage processor from the host computing devices and directed to each one of the data objects into reads and writes to the respective ones of the container files, wherein the file systems map contents of the container files to a set of non-volatile storage devices in the data storage system that are communicably coupled to the storage processor and that provide non-volatile storage for the file systems, such that at least a portion of each one the container files is mapped to a respective portion of an individual one of the non-volatile storage devices, wherein portions of the non-volatile storage devices are allocated to the file systems from a shared storage pool that is also located within the storage processor, wherein a first one of the container files is mapped by a first one of the file systems to portions of the non-volatile storage devices allocated from the shared storage pool to the first one of the file systems, wherein a second one of the container files is mapped by a second one of the file systems to portions of the non-volatile storage devices allocated from the shared storage pool to the second one of the file systems, and wherein at least one portion of the non-volatile storage devices allocated from the shared storage pool to the first one of the file systems was previously allocated from the shared storage pool to the second one of the file systems; and encrypting each one of the data objects by the storage processor completely encrypting the contents of the respective container file that the data object is mapped to using a single encryption key that is uniquely associated with the data object, whereby different ones of the container files are completely encrypted using different individual encryption keys.

2. The method of claim 1, wherein each one of the data objects mapped to the container files is one of a file system, a LUN (Logical Unit Number), and a VVol (virtual volume).

3. The method of claim 1, wherein the method further comprises:
assigning a unique encryption key to each one of the data objects; and
wherein encrypting each one of the data objects is performed using the unique encryption key assigned to the data object to encrypt the respective container file that the data object is mapped to.

4. The method of claim 3, wherein the method further comprises:
storing the unique encryption key assigned to each one of the data objects in an encryption key store that is internal to the storage system and accessible to an encryption manager within the storage system; and
preventing access to the encryption key store from outside the storage system by encrypting the encryption key store using an encryption key uniquely assigned to the storage system.

5. The method of claim 3, wherein the method further comprises:
replicating at least one of the data objects at a replication site, by replicating the data object to the replication site in encrypted form to be stored at the replication site as an encrypted failover copy of the data object; and
transmitting, to the replication site, the encryption key uniquely assigned to the data object, for use at the replication site to decrypt the encrypted failover copy of the data object in response to read requests directed to the data object that are received at the replication site after a failover.

6. The method of claim 3, wherein encrypting each one of the data objects by encrypting the respective container file that the data object is mapped to includes:
encrypting individual blocks of the data objects using the encryption key associated with the data object; and
storing encrypted individual blocks of the data objects into individual blocks of the respective container files.

7. The method of claim 6, wherein the method further comprises compressing data for the data objects into compressed blocks; and
wherein encrypting the individual blocks of the data objects is performed on the compressed blocks.

8. The method of claim 7, wherein encrypting each one of the data objects by encrypting the respective container file to which the data object is mapped is performed on data directed to the data object and received from the plurality of host computing devices into a cache of the data storage system.

9. The method of claim 3, wherein the method further comprises erasing data stored by one of the data objects by destroying the encryption key associated with the data object.

10. The method of claim 8, wherein the cache includes DRAM (Dynamic Random Access Memory) that is battery backed-up and redundantly mirrored across multiple storage processors of the data storage system.

11. A data storage system, including at least one storage processor, the storage processor comprising a set of processing units and memory, coupled to the set of processing units, the memory storing instructions which, when executed by the set of processing units of the storage processor, cause the set of processing units of the storage processor to:

map each one of a plurality of data objects to a single respective one of a plurality of container files stored in a set of file systems located within the storage processor, wherein the data objects are served by the data storage system and accessible over a network by at least one host application executing in one or more of a plurality of host computing devices, wherein the file systems are internal to the storage processor, wherein the storage processor converts input/output requests received over the network by the storage processor from the host computing devices and directed to each one of the data objects into reads and writes to the respective ones of the container files, wherein the file systems map contents of the container files to a set of non-volatile storage devices in the data storage system that are communicably coupled to the storage processor and that provide non-volatile storage for the file systems such that at least a portion of each one of the container files is mapped to a respective portion of an individual one of the storage devices, wherein portions of the non-volatile storage devices are allocated to the file systems from a shared storage pool that is also located within the storage processor, wherein a first one of the container files is mapped by a first one of the file systems to portions of the non-volatile storage devices allocated from the shared storage pool to the first one of the file systems, wherein a second one of the container files is mapped by a second one of the file systems to portions of the non-volatile storage devices allocated from the shared storage pool to the second one of the file systems, and wherein at least one portion the non-volatile storage devices allocated from the shared storage pool to the first one of the file systems was previously allocated from the shared storage pool to the second one of the file systems; and encrypt each one of the data objects by the storage processor completely encrypting the contents of the respective container file that the data object is mapped to using an encryption key that is uniquely associated with the data object, whereby different ones of the container files are completely encrypted using different individual encryption keys.

12. The data storage system of claim 11, wherein at least one of the data objects mapped to the container files is a LUN (Logical Unit Number).

13. The data storage system of claim 11, wherein at least one of the data objects mapped to the container files is a file system.

14. The data storage system of claim 11, wherein at least one of the data objects mapped to the container files is a VVol (virtual volume).

15. The data storage system of claim 11, wherein the instructions, when executed by the set of processing units of the storage processor, further cause the set of processing units to:
assign a unique encryption key to each one of the data objects; and
wherein each one of the data objects is encrypted by using the unique encryption key assigned to the data object to encrypt the respective container file that the data object is mapped to.

16. The data storage system of claim 15, wherein the instructions, when executed by the set of processing units of the storage processor, further cause the processing units to:
store the unique encryption key assigned to each one of the data objects in an encryption key store that is internal to the apparatus and accessible to an encryption manager within the apparatus; and prevent access to the encryption key store from outside the apparatus by encrypting the encryption key store using an encryption key uniquely assigned to the apparatus.

17. The data storage system of claim 15, wherein the instructions, when executed by the set of processing units of the storage processor, further cause the processing units to:

replicate at least one of the data objects at a replication site, by replicating the data object to the replication site in encrypted form to be stored at the replication site as an encrypted failover copy of the data object; and transmit, to the replication site, the encryption key uniquely assigned to the data object, for use at the replication site to decrypt the encrypted failover copy of the data object in response to read requests directed to the data object that are received at the replication site after a failover.

18. The data storage system of claim 15, wherein the instructions, when executed by the set of processing units of the storage processor, further cause the processing units to encrypt each one of the data objects by encrypting the respective container file that the data object is mapped to by i) encrypting individual blocks of the data objects using the encryption key associated with the data object, and ii) storing encrypted individual blocks of the data objects into individual blocks of the respective container files.

19. The data storage system of claim 18, wherein the instructions, when executed by the set of processing units of the storage processor, further cause the processing units to:

compress data for the data objects into compressed blocks; and wherein encrypting the individual blocks of the data objects is performed on the compressed blocks.

20. A non-transitory, computer-readable medium including instructions which, when executed by a set of processing units of a storage processor in a data storage system, cause the set of processing units of the storage processor to perform a method for providing encryption for data objects in the data storage system, the method comprising:

mapping each one of a plurality of data objects, by the storage processor in the data storage system, to a single respective one of a plurality of container files stored in a set of file systems located within the storage processor, wherein the data objects are served by the data storage system and accessible over a network by at least one host application executing in one or more of a plurality of host computing devices, wherein the file systems are internal to the storage processor in the data storage system, wherein the storage processor converts input/output requests received over the network by the storage processor from the host computing devices and directed to each one of the data objects into reads and writes to the respective ones of the container files, wherein the file systems map contents of the container files to a set of non-volatile storage devices in the data storage system that are communicably coupled to the storage processor and that provide non-volatile storage for the file systems such that at least a portion of each one the container files is mapped to a respective portion of an individual one of the non-volatile storage devices, wherein portions of the non-volatile storage devices are allocated to the file systems from a shared storage pool that is also located within the storage processor, wherein a first one of the container files is mapped by a first one of the file systems to portions of the non-volatile storage devices allocated from the shared storage pool to the first one of the file systems, wherein a second one of the container files is mapped by a second one of the file systems to portions of the non-volatile storage devices allocated from the shared storage pool to the second one of the file systems, and wherein at least one portion of the non-volatile storage devices allocated from the shared storage pool to the first one of the file systems was previously allocated from the shared storage pool to the second one of the file systems; and encrypting each one of the data objects by the storage processor completely encrypting the contents of the respective container file that the data object is mapped to using a single encryption key that is uniquely associated with the data object, whereby different ones of the container files are completely encrypted using different individual encryption keys.

21. The method of claim 9, further comprising:

wherein each one of the container files has a logical address space and a set of associated physical addresses, wherein the logical address space of each container file comprises a range of logical offsets into the container file, wherein the logical address space of each container file is tracked by an inode structure of the container file, wherein the inode structure of each container file is stored in the one of the file systems that stores the container file, wherein the set of physical addresses associated with each container file comprises particular addresses of units of non-volatile storage in the storage devices providing non-volatile storage for the file systems, and wherein the units of non-volatile storage are used by the file system that stores the container file to store the data of the container file.

22. The method of claim 21, wherein encrypting each one of the data objects by encrypting the respective container file that the data object is mapped to includes i) encrypting individual blocks of the data object using the unique encryption key assigned to the data object while the individual blocks of the data object are stored in a cache of the data storage system, and ii) storing encrypted individual blocks of the data object from the cache of the data storage system into the units of non-volatile storage that are used by the file system that stores the container file to store the data of the container file.

23. The method of claim 22, wherein mapping each one of the data objects to a respective one of the container files stored in the set of files systems located within the storage processor includes mapping at least one data location within the data object specified within the input/output requests to a set of logical offsets within the container file to which the data object is mapped.

24. The method of claim 1, wherein each one of the write requests in the input/output requests received by the storage processor specifies data to be written to a specified one of the data objects and an offset into the specified data object at which the specified data is to be written; and wherein the storage processor processes each one of the write requests in the input/output requests it receives at least in part by i) mapping the offset into the data object specified by the write request to a logical offset within the respective container file, and ii) writing an encrypted version of the data specified by the write request to the logical offset within the respective container file, wherein the encrypted version of the data specified by the write request is encrypted with an encryption key uniquely associated with the data object.

25. The method of claim 1, wherein the storage processor processes each one of the write requests in the input/output requests it receives at least in part by:
  i) determining a logical offset within a respective one of the container files that is mapped to a data object specified in the write request;
  ii) writing data specified in the write request to the logical offset within the respective one of the container files that is mapped to the data object specified in the write request; and
  iii) encrypting the data specified in the write request after receipt of the write request and before writing the data specified in the write request to the respective container file, using an encryption key uniquely associated with the data object specified in the write request.

\* \* \* \* \*